United States Patent

Ruehle

[15] 3,651,451
[45] Mar. 21, 1972

[54] CONTINUOUS VELOCITY ESTIMATION

[72] Inventor: William H. Ruehle, Duncanville, Tex.
[73] Assignee: Mobil Oil Corporation
[22] Filed: Oct. 23, 1969
[21] Appl. No.: 868,784

[52] U.S. Cl. ............... 340/15.5, 340/15.5 DP, 340/15.5 DS
[51] Int. Cl. ............................................................. G01v 1/00
[58] Field of Search .......................... 340/15.5 DP, 15.5 DS

[56] References Cited

UNITED STATES PATENTS 3,417,370  12/1968  Brey ..................................... 340/15.5
2,975,399   3/1961  Burns .................................... 340/15.5

OTHER PUBLICATIONS

Geophysics, Vol. 34, No. 6 p. 859– 881, Velocity Spectra, Taner and Koehler

Primary Examiner—Rodney D. Bennett, Jr.
Assistant Examiner—H. A. Birmiel
Attorney—William J. Scherback, Frederick E. Dumoulin, Arthur F. Zobal, Andrew L. Gaboriault and Sidney A. Johnson

[57] ABSTRACT

In seismic exploration, an index set of travel time curves is specified. This index set of travel curves is used to determine velocity by a signal detection technique. At different values of zero offset time, different velocities are associated with each of the curves. Since the index set of travel time curves is computed only once, for a prescribed velocity time range, considerable computer time is saved.

11 Claims, 5 Drawing Figures

CONTINUOUS VELOCITY ESTIMATION

BACKGROUND OF THE INVENTION

This invention relates to the continuous estimation of acoustic velocity from a set of seismic traces and more particularly to producing an index set of travel time curves for use in the estimation of acoustic velocity.

In seismic exploration, the measurement of velocity is generally considered the major parameter in the processing and interpretation of seismograms. The determination of the acoustic velocity characteristics of seismograms is described in "Seismic Velocities From Subsurface Measurements," C. H. Dix, Geophysics, Vol. 20, pages 868–886, 1955. In general, acoustic velocity is determined from seismograms by the following relationship:

$$\Delta T^2 = X^2/V^2 - 2 T_0 \Delta T$$

One type of field technique which produces sets of traces in which the reflection times follow the above relationship is commonly referred to as common depth point, or common reflection point, seismic exploration.

The acoustic velocity characteristic of the earth is an important parameter used in geophysical interpretation. It is also necessary to know acoustic velocity as accurately as possible in order to make normal moveout corrections of the seismic traces. U.S. Pat. No. 3,417,370, Brey, shows a typical system in which signal detection techniques are used to estimate acoustic velocity from seismic traces. In techniques such as this velocity is computed for each trace for each time of interest, typically for equally spaced zero offset times. These computations of velocity consume a great amount of computer time.

SUMMARY OF THE INVENTION

In accordance with an important aspect of the present invention, an index array of travel time curves specifies $\Delta T$ versus $X$ for a set of velocities passing through sample points on the outer trace of a set. This array is computed only once and it could be used to obtain velocity at every CDP set of traces with a minimum of computation time.

Initially, an a priori estimate of velocity is made to determine the range of velocities over which arrival time curves will be computed. Then the array of travel time curves is computed in this bracketed range.

At the first sampling time on the first trace in the set of traces, a set of travel time curves is generated relating the horizontal distance $X$ to each source, the time shift from trace to trace $\Delta T$, the acoustic velocity $V$, and the zero offset time $T_0$. For succeeding zero offset times, the velocity associated with each curve in the set is recomputed.

Seismic reflections in the traces are identified by detecting the signal across the traces along the travel time curves. In one particular signal detection technique, the traces are summed along each of the travel time curves in the set. The maximum signal power identifies the proper velocity.

In accordance with a further aspect of the present invention, the selected acoustic velocity is plotted at the zero offset time and at the horizontal position for which it was selected. A determination is made as to whether selected reflections have continuity between sets of seismic traces. If continuity is detected, a continuous line segment is plotted with the associated acoustic velocity.

DESCRIPTION OF A PARTICULAR EMBODIMENT

Figure 1:
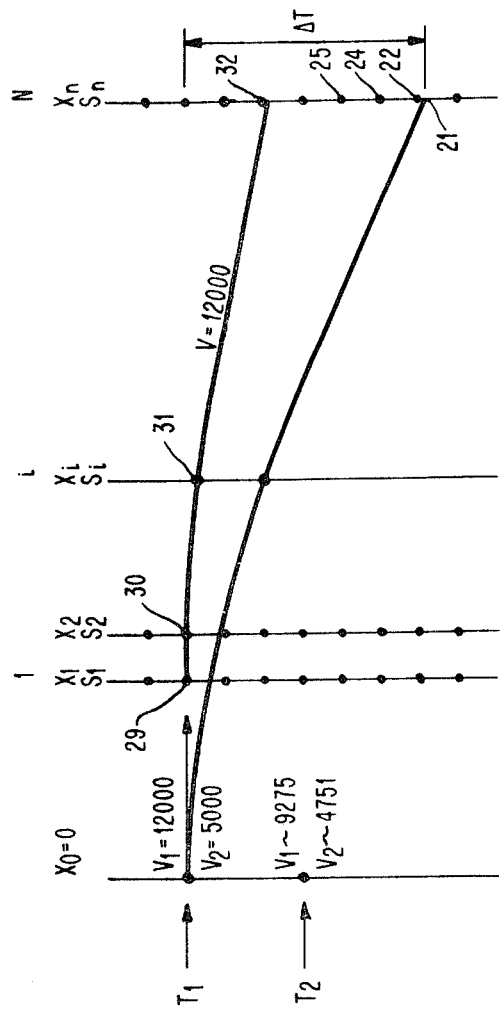
FIG. 1 depicts a set of seismic traces.

Referring to FIG. 1, there is shown a set of seismograms, $S_1$, $S_2 \ldots S_i \ldots S_n$. As is the usual practice, these seismograms are digitized so that values at periodic sample times, indicated by the vertically spaced dots, represent reflections of seismic energy. The seismic energy is produced from a plurality of spaced sources and reflected from subsurface interfaces. The abcissa in FIG. 1 represents horizontal distance along a line of exploration. Sources of seismic energy and detectors for detecting the reflected seismic energy are spaced along the line of exploration. In FIG. 1, $x_i$ is the horizontal distance of the detector producing seismogram 1, $x_i$ is the horizontal distance of the seismometer producing the trace $S_i$ and so on.

The zero offset times for this set of traces are the theoretical times of reflections for a trace directly beneath the source, at the location denoted $x_0$. The zero offset times of $T_1$ and $T_2$ have been denoted in FIG. 1. As previously mentioned, the times of reflections across this set of traces are described by:

$$\Delta T^2 = x^2/V^2 - 2T_o \Delta T$$

where $T_0$ is the zero offset time, $T$ is the time of a reflection on a particular trace, $x$ is the horizontal distance associated with that trace and $\Delta T$ is the time shift of the reflection to that trace. Stated another way, the times of reflections across the set of traces are specified by a hyperbolic curve, the shape of which depends upon the velocity of the earth. Two hyperbolic curves have been drawn across the set of traces in FIG. 1 to show the expected time of arrival of a particular reflection for two different assumed values of velocity $V_1$ and $V_2$.

Figure 2:
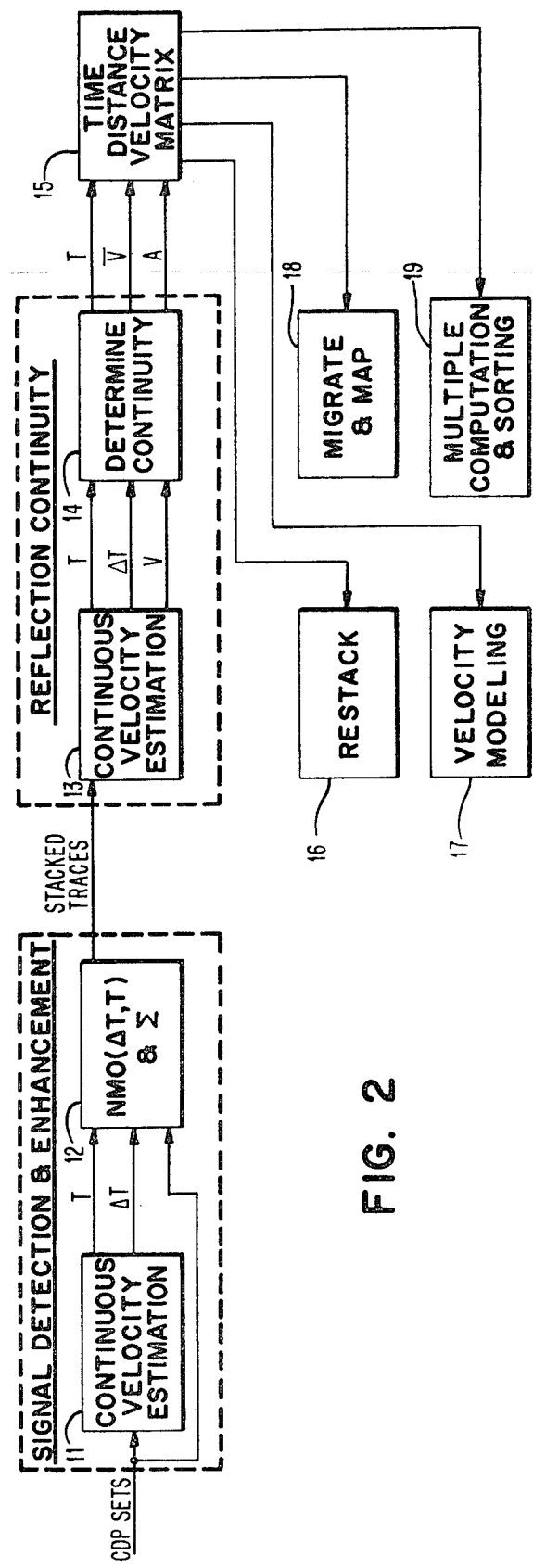
FIG. 2 is a block diagram of a system making use of the invention.

Before describing the process by which the present invention estimates velocity, reference is made to FIG. 2 which depicts the type of processing in which the present invention is useful. The continuous velocity estimation technique of this invention can be used to determine the reflection times and the time shifts as indicated at 11. These reflection times and time shifts can be used for normal moveout correction as indicated at 12. After normal moveout correction, the traces can be conventionally stacked to enhance the reflections. It is important to note that in this normal moveout correction no intermediate computations of velocity are required. The traces are merely composited along the $\Delta T$, $x$ curves which yield the maximum signal.

The stacked traces are again applied to the continuous velocity estimation technique of this invention as indicated at 13. The output is reflection times, time shifts and velocity. The amplitude of the reflections are determined and a determination is made as to whether there is continuity between reflections as indicated at 14. The output is a matrix 15 indicating time, distance, velocity and amplitude of each reflection. This time-distance-velocity-amplitude matrix can be used in a number of ways.

The traces can be restacked as indicated at 16 to further enhance signal reflections. The information can be used in a velocity modeling routine 17, such as that disclosed in copending application Ser. No. 842,523 filed July 17, 1969, Ruehle et al., (Attorney's Docket No. 7310). Alternatively, the information can be used in a migration and mapping technique, such as that disclosed in copending application Ser. No. 696,661, filed Jan. 9, 1968, Ruehle et al. Or, the information can be used to compute and sort multiple reflections in a procedure similar to that also described in the aforementioned Ruehle et al., application, Ser. No. 696,661.

Figure 3:
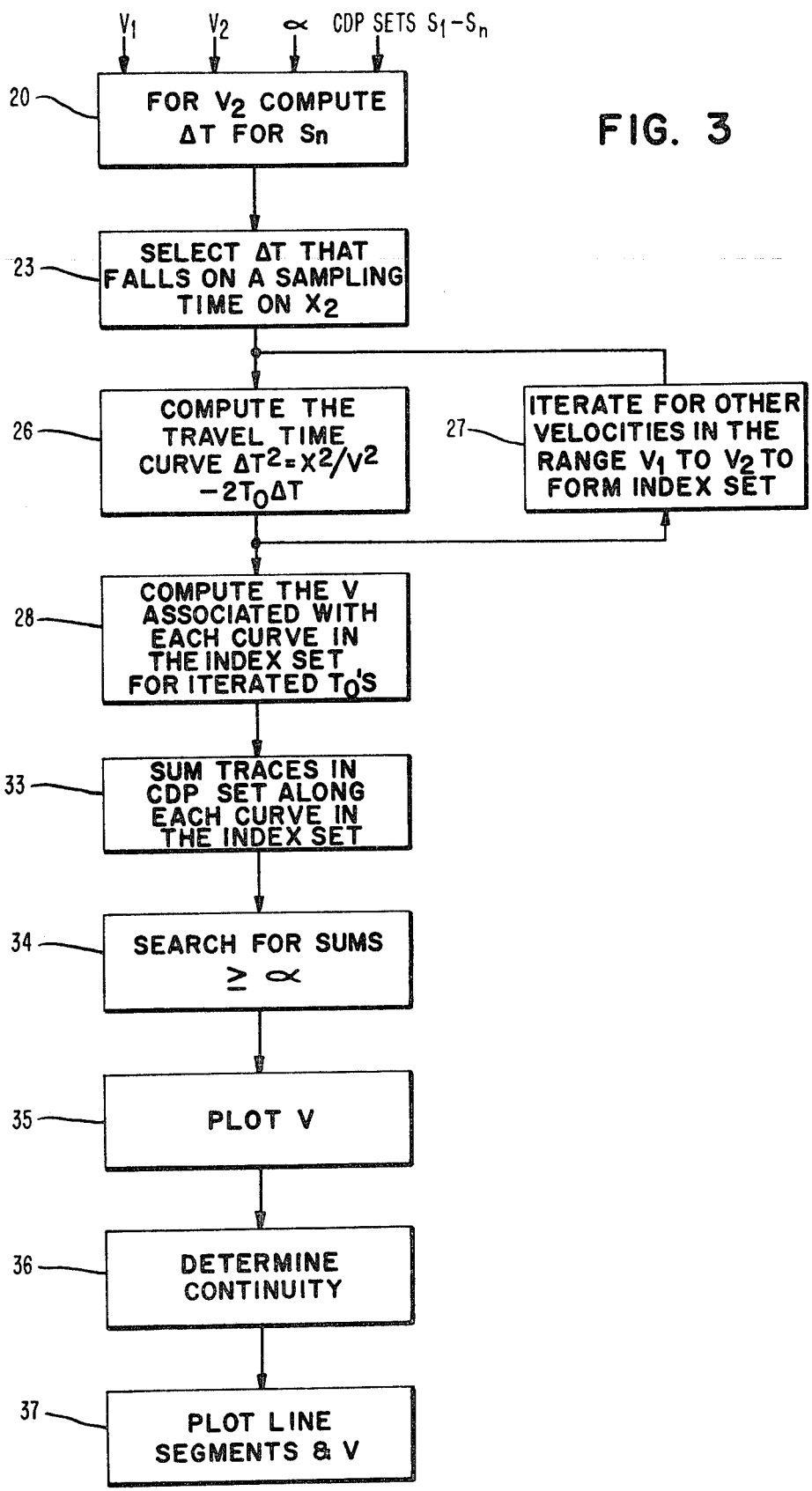
FIG. 3 is a flow sheet depicting the process of the present invention.

The flow sheet of the process of this invention is shown in FIG. 3. The inputs to the system include sets of common depth point traces, each set including traces $S_1 - S_n$. Also applied as inputs to the system are the limits of the range of expected velocities, the range being defined by the limits $V_1$ and $V_2$. input to the system is the threshold $\Delta$ against which the signal power of reflections is compared to determine whether a reflection exists along a particular travel time curve.

The first two indicated steps are used to start the computation of travel time curves on a particular sample on the last trace. As indicated at 20, the time shift $\Delta T$ to the far trace $S_n$ is computed for the velocity $V_2$. As shown in FIG. 1, this $\Delta T$ occurs at the point 21 on the trace $S_n$. That is, the travel time curve does not fall on a sample of the far trace $S_n$. Therefore, the routine selects the $\Delta T$ corresponding with the sample occurring at 22 in FIG. 1. The selection of this $\Delta T$ that falls on the sample 22 is indicated at 23 in the flow sheet. Using this $\Delta T$, the actual velocity for that travel time curve can be computed. Then, the $\Delta T$ for each of the other traces $S_1 \ldots S_i \ldots S_{n-1}$ can be computed. This specifies a travel time curve:

$$\Delta T^d = x^2/v^2 - 2T_0 \Delta T$$

Then, other travel time curves are computed for other samples on the trace $S_n$. For example, the travel time curves which intersect $S_n$ at the sample times 24, 25, and so on, are each computed. The computation of these travel time curves are indicated at 26 in the flow sheet. As indicated at 27, the computation of travel time curves is iterated for velocities in the range $V_1$ to $V_2$. For example, there may be 100 travel time curves in the index set.

For this index set of travel time curves, the velocity associated with each curve is computed for different iterated zero offset times, as indicated at 28. That is, the same curvature $\Delta T$ is retained but $T_0$ is larger. Therefore, the associated value of velocity is smaller. This approach permits the calculation of an index set for signal detection once, or at most a limited number of times, for each record. This is to be contrasted with prior art techniques wherein indices are computed for each velocity for each time of interest thereby consuming a great deal more computer time. For example, there are normally approximately 2,000 sample times on each trace for which determination of velocity must be made. The calculation of velocity on each trace for each sample time requires a great deal of computation. On the other hand, in this procedure the $\Delta T$'s for all of the traces are computed only once. For each one of the 2,000 sample times, only one computation of velocity is made for each one of the curves.

It should be noted that it will probably not be possible to use the same index set of travel time curves over the full length of the records. The range of velocities will change for each sample time. For example, assume that the range for zero offset time $T_1$ was $V_1 = 12,000$ feet per second and $V_2 = 5,000$ feet per second. For the zero offset time $T_2$, the range might change to 4,751 through 9,275 feet per second. At some later record time, the range of velocities associated with the index set may not encompass the actual range of velocities expected in that area. Therefore, at this point, there must be a recomputation of the travel time curves. It is possible that three or more index sets of travel time curves may be used over the full record length. In practice, an index set is computed each 25 samples so that an a priori V(t) can be followed with a small number of travel time curves.

In accordance with an important aspect of the present invention, reflections in the traces are detected along the curved lines of the index set. One particular signal detection techniques which can be used is to sum the samples from each trace along one of the curved lines. For example, referring to FIG. 1, the sum is formed of the value at the sampling time 29 on the first trace, the sampling time 30 on the second trace, the sampling time 31 on the $i$th trace, the sampling time 32 on the $a$th trace, and the values at the sampling time on intermediate traces specified by that travel time curve. This sum indicates the signal power of reflections along that line. A similar sum is formed along each of the curves in the index set. This summation of the traces along the travel time curves is indicated at 33 in FIG. 3.

The sums are compared to determine the travel time curve associated with the maximum reflection signal power. The acoustic velocity associated with the travel time curve so identified is selected as the acoustic velocity at that time. Next, a determination of whether an actual reflection exists at this record time is made. This is done by comparing the sum to the threshold $\alpha$. The search for sums exceeding $\alpha$ is indicated at 34 in the flow sheet. Where the sum exceeds the threshold $\alpha$, the value of velocity is plotted as indicated at 35.

Figure 4:
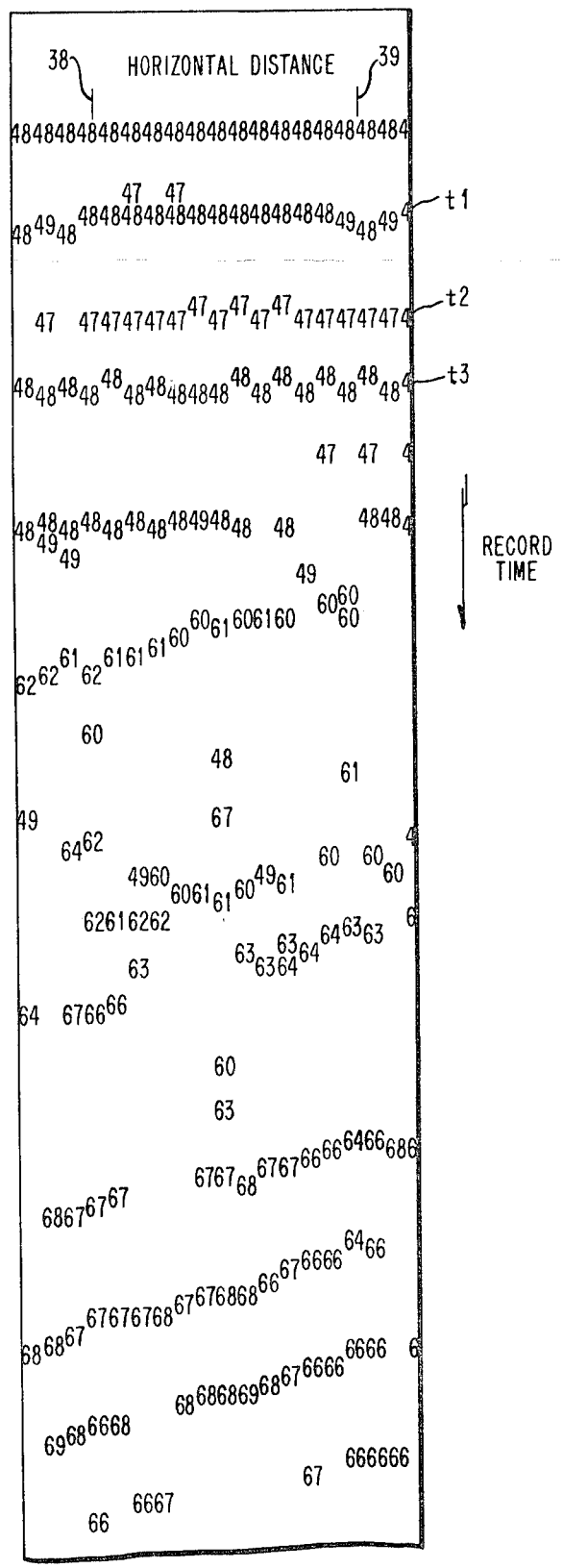
FIG. 4 shows a plot of velocities.

A portion of a plot produced by the subroutine indicated at 35 is shown in FIG. 4. In this plot, the abscissa is horizontal distance between common depth point sets and the ordinant is record time. For example, at the record time $t$ the velocity 4,900 feet per second is plotted for the CDP set at the extreme right. At the time $T2$, the velocity 4,700 is plotted for this CDP set. At the time $t3$, the velocity 4,800 is plotted for this CDP set.

For the next CDP set to the left, the velocity 4,800 is plotted at time $t1$, the velocity 4,700 is plotted at the time $t2$ and the velocity 4,800 is plotted at the time $t3$.

The next set of instructions in the process determines whether there is reflection continuity, that is, whether the same reflection has been detected between adjacent CDP sets. This set of instructions is indicated at 36 in the flow sheet.

Continuity is determined by looking for a reflection which, for example, falls within 20 milliseconds on either side of a reflection detected for an adjacent CDP set. If there is continuity, a line segment is plotted with continuity across a space representing the distance between adjacent sources. The plotting of these line segments is indicated at 37.

Figure 5:
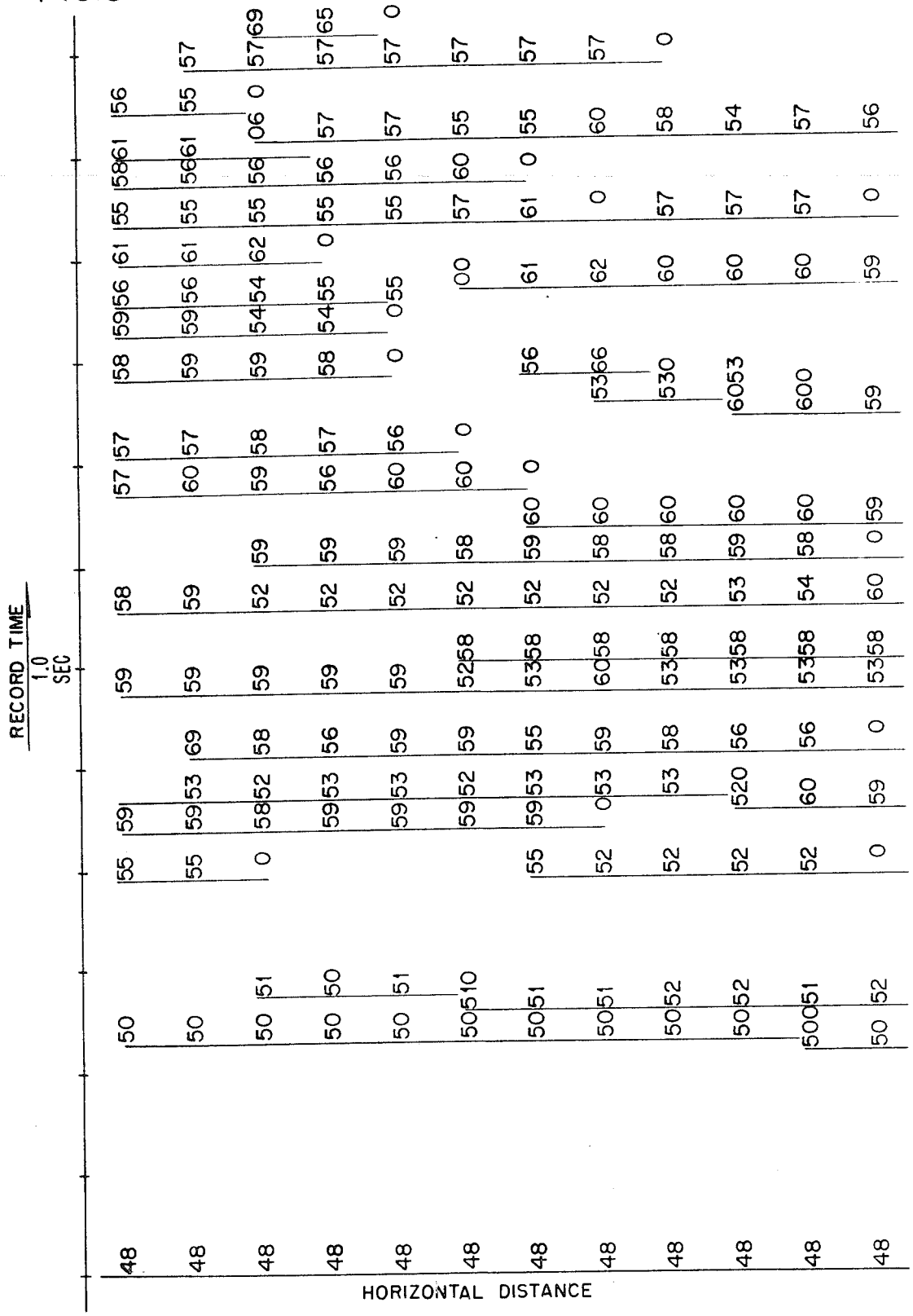
FIG. 5 shows a plot with continuity indicated between reflections.

A portion of a plot produced in accordance with this technique is shown in FIG. 5. FIG. 5 shows the plotting of velocities for 12 adjacent CDP sets. (This plot is derived from the same area as the plots between the points 38 and 39 in FIG. 4. Note that FIGS. 4 and 5 have different scales.) At 1.0 seconds record time in FIG. 5, there is a line segment indicating the detection of a continuous reflection across all 12 CDP sets. Other continuous reflections have been plotted in FIG. 5.

A plot, such as that shown in FIG. 5, is a useful tool for the geophysicist. It indicates continuous reflections, and it also indicates the acoustic velocity characteristics of the earth associated with that continuous reflection.

While the method of the present invention can be practiced with the use of several well-known types of computing apparatus, the method is particularly suitable for use with a general purpose digital computer.

While a particular embodiment of the invention has been shown and described, it will be understood that various other modifications are possible without departing from the principles of the invention. The appended claims are, therefore, intended to cover any such modifications.

What is claimed is:

1. In seismic exploration wherein values at periodic sampling times on a set of seismic traces represent the reflections of seismic energy produced from a plurality of spaced sources and reflected from subsurface interfaces, the method of utilizing automatic computing apparatus to perform each of the following steps, said method comprising:
   computing an index set of travel time curves for the zero offset sampling time in said set of seismic traces,
   applying a signal detecting operation to said traces to detect reflections in said traces along said travel curves for different, iterated, zero offset sampling times, and
   computing the velocity associated with each curve in said set for different, iterated, zero offset sampling times.

2. The method recited in claim 1 wherein said set of travel time curves is specified by the following relationship:

$$\Delta T^2 = x^2/V^2 - 2T_0 \Delta T$$

where $x$ is the distance from the source producing said first trace to the source producing the last trace in said set, $V$ is the acoustic velocity characteristic of the earth, $T_0$ is said particular sampling time and $\Delta T$ is the time shift between said first trace and said last trace, said set including one curve for each of a plurality of values of velocity in a given range.

3. The method recited in claim 1 wherein said detecting step comprises:
   summing a value from each of said seismic traces, said values being at periodic sampling times specified by one of said travel time curves to form a sum representing the signal power of said traces along said travel time curve, and
   iterating the foregoing step for each travel time curve in said set to form sums each indicating the signal power of reflections along different ones of said travel time curve.

4. The method recited in claim 3 further comprising:
comparing said sums to determine the travel time curve associated with maximum reflection signal power, and
selecting the acoustic velocity associated with the travel time curve identified in the foregoing step.

5. The method recited in claim 4 further comprising:
plotting the selected acoustic velocity at the zero offset time for which it was selected.

6. The method recited in claim 5, and
iterating the foregoing for different zero offset times and for different ones of said sources, and
plotting a reflection with continuity across a space representing the distance between adjacent sources if a reflection is detected which falls within a given time range for both sources.

7. The method recited in claim 1 further comprising:
plotting the alpha numeric representation of the computed acoustic velocity upon a distance-time plot representing said subsurface interfaces.

8. The method recited in claim 1 wherein said detecting step comprises:
summing a value from each of said seismic traces, said values being at periodic sampling times specified by a selected velocity to form a sum representing the signal power of the values of said traces, and
iterating the foregoing step to form sums, each indicating the signal power of reflections across said traces.

9. The method recited in claim 8 further comprising:
comparing said sums to determine the velocity associated with maximum reflection signal power.

10. In seismic exploration wherein the reflections of seismic energy are produced from a plurality of spaced sources and reflected from subsurface interfaces, the method of utilizing automatic computing apparatus comprising:
storing a parameter related to the velocity characteristic of the earth for different, iterated, zero offset sampling times for each trace,
detecting reflections is said traces for different, iterated, zero offset sampling times and for different velocities,
selecting the acoustic velocity associated with the maximum detected reflection in the foregoing step, and
plotting the alpha numeric representation of the selected acoustic velocity upon a distance-time plot representing said subsurface interfaces.

11. In seismic exploration wherein the reflections of seismic energy are produced from a plurality of spaced sources and reflected from subsurface interfaces, the method of utilizing automatic computing apparatus comprising:
storing a parameter related to the velocity characteristic of the earth for different, iterated, zero offset sampling times for each trace,
detecting reflections in said traces for different, iterated, zero offset sampling times and for different velocities,
selecting the acoustic velocity associated with the maximum detected reflection in the foregoing step, and
storing the selected acoustic velocity together with the time of the detected reflection and the distance of the spaced source producing the reflection.

* * * * *

UNITED STATES PATENT OFFICE
CERTIFICATE OF CORRECTION

Patent No. 3,651,451  Dated March 21, 1972

Inventor(s) William H. Ruehle

It is certified that error appears in the above-identified patent and that said Letters Patent are hereby corrected as shown below:

Column 1, line 17, that portion of the formula reading $X^2/V2$ should read $x^2/V^2$;

lines 38 and 48, "X" should read -- x --; and

Column 2, line 12, "$x_i$" should read -- $x_1$ --;

line 20, that portion of the formula reading $x^2/V2$ should read $x^2/V^2$;

line 71, before "input" insert --Another--; and same line, "$\Delta$" should read -- $\alpha$ --.

Column 3, line 11, the formula should appear as follows:

$$\Delta T^2 = x^2/V^2 - 2T_0 \Delta T$$

line 56, "techniques" should read --technique--; and
line 61, "$\alpha$th" should read -- nth --.

Column 4, line 4, "tthe" should read -- t1, the --;
line 6, "$\overline{T}2$" should read -- t2 --.

Column 6, line 8, "is" should read --in--.

Signed and sealed this 12th day of September 1972.

(SEAL)
Attest:

EDWARD M. FLETCHER, JR.
Attesting Officer

ROBERT GOTTSCHALK
Commissioner of Patents